US007801753B2

(12) United States Patent
Vemula et al.

(10) Patent No.: US 7,801,753 B2
(45) Date of Patent: Sep. 21, 2010

(54) PURCHASE PLANNING AND OPTIMIZATION

(76) Inventors: Chandrasekar Vemula, 39939 Stevenson Common, # 2055, Fremont, CA (US) 94538; Vivek Sehgal, 9444 Abbey Rd., Irving, TX (US) 75063

( * ) Notice: Subject to any disclaimer, the term of this patent is extended or adjusted under 35 U.S.C. 154(b) by 1946 days.

(21) Appl. No.: 10/788,960

(22) Filed: Feb. 28, 2004

(65) Prior Publication Data
US 2004/0172321 A1    Sep. 2, 2004

Related U.S. Application Data

(60) Provisional application No. 60/451,239, filed on Mar. 1, 2003.

(51) Int. Cl.
*G06Q 10/00*    (2006.01)
(52) U.S. Cl. ......................................................... 705/7
(58) Field of Classification Search ...................... 705/7
See application file for complete search history.

(56) References Cited

U.S. PATENT DOCUMENTS

| | | | | |
|---|---|---|---|---|
| 6,151,582 | A * | 11/2000 | Huang et al. .................... | 705/8 |
| 6,272,472 | B1 * | 8/2001 | Danneels et al. ............... | 705/27 |
| 6,671,673 | B1 * | 12/2003 | Baseman et al. ................ | 705/7 |
| 7,389,248 | B2 * | 6/2008 | Baumann et al. ............... | 705/7 |
| 2002/0156663 | A1 * | 10/2002 | Weber et al. ................... | 705/7 |
| 2003/0050823 | A1 * | 3/2003 | Gehman et al. ............... | 705/10 |

OTHER PUBLICATIONS

S. H. Ghodsypour and C. O'Brien, "A Decision Support System for Supplier Selection Using an Integrated Analytic Hierarchy Process and Linear Programming," 56-57 Int. J. Production Econ. 199-212 (1998).*

Meir J. Rosenblatt, et al., "An Acquisition Policy for Single Item Multi-Supplier System," 44 Management Sci. S96-S100 (1998).*

* cited by examiner

*Primary Examiner*—Beth V Boswell
*Assistant Examiner*—Neil R Kardos
(74) *Attorney, Agent, or Firm*—Kali Law Group, P.C.

(57) ABSTRACT

The present invention provides a purchase planning system for making optimal procurement recommendations for purchasing direct materials. The system provides methods for modeling supply channels and supply contracts, for producing a lowest cost purchase plan, for evaluating the supply agreements and for maintaining contractual compliance with vendors. The process considers contractual details and generates intelligent procurement recommendations to minimize the total procurement cost by taking advantage of discounts, variations in price, freight, tariffs, taxes, duties, etc., by minimizing penalties and by considering substitution of parts with their alternates, while at the same time complying with the corporate business rules such as budgets by item groups, supplier spend limits, minority owned business development, supplier preferences and strategic split percentages, spend minimization/maximization with a specific supplier, etc. The process has extended uses for assessment of proposed contracts by modeling them as virtual contracts, for computation of purchase order contract compliance before an order is released, for better managing cash flow by providing future visibility through the planning horizon. The system uses mixed integer linear programming techniques to formulate and optimize the solution.

3 Claims, 5 Drawing Sheets

PURCHASE PLANNING AND OPTIMIZATION

RELATED APPLICATIONS

This application claim priority from U.S. Provisional Application No. 60/451,239, filed Mar. 1, 2003, the disclosure of which is hereby incorporated by reference in its entirety.

BACKGROUND

Purchase planning for direct material requirements largely depends on the master planning systems. Master planning systems generate material requirements by considering demand/forecast for finished goods and exploding the bill of materials to generate projected requirements of raw material and sub-assembly quantities. The master planning systems may consider other factors some examples of which are inventory policies, supply lead times, supply lot-sizes, supplier capacities, on-hand inventory, supplier allocation policies, shipping and receiving calendars for generating the scheduled material requirements. These material requirements are then used for procurement.

However there are two groups of parameters that must be addressed by purchase planning systems. First, it must be able to model and address corporate policy guidelines, some examples of which are inventory levels, fulfillment rates, and approved vendor lists. Second, it must be able to model the contractual terms of the supply agreements with various vendors, some examples of which are obligations, rebates, volume based price breaks, and flex quantity limitations.

The currently existing systems that address master planning and supply chain planning do not adequately address the second groups of requirements above. On the other hand, the currently existing contract management systems do not go beyond modeling the supply contracts, and don't provide any planning capabilities to generate purchase schedules that are compliant with the contracts, as well as the corporate policies.

Therefore the existing systems do not adequately address all the operational constraints that are relevant for purchasing. Partial list of examples of such constraints that remain un-addressed by the existing systems are trading partner terms, conditions and agreements for supply contracts, enterprise business rules and various cost factors that form the landed cost for an item. Another problem that is inadequately addressed by the existing systems is that while the master planning is normally done on a continual basis, tactical and operational purchase planning is not necessarily kept in sync with the latest master planning data. Another example showing this would be the fact that the material requirement patterns change with each master-planning run, but these are not used to determine the best vendor quotas or business splits after each run of master-planning.

Purchase decisions are complex and involve multiple parameters. If these parameters are not considered, possible cost saving opportunities are lost. In addition there could be penalties that could have been avoided or reduced using intelligent planning. For example consider a simple case of two vendors. If there is a contractual obligation to buy a certain quantity of material by a certain week from the first supplier then it may not be an effective decision to buy anything from the second supplier in that week. However, a hard coded allocation solution will automatically decide to buy from the first as well as second vendor based on vendor quota rules and may incur a penalty for not meeting the obligations from the first supplier.

Therefore, an ideal purchase-planning tool should include capabilities to model all the parameters mentioned and other similar parameters all of which are not covered above. It should leverage optimization technologies to minimize the overall cost of direct material purchasing while ensuring complete compliance to the trading partner terms and conditions as well as the corporate business rules. The tool should also provide a system for evaluating the effect of such terms and/or business rules on the overall purchasing costs. The tool should provide simulation capabilities to actually influence the development of supply channel network so as to best meet the purchasing requirements of an enterprise.

BRIEF SUMMARY

In response to these needs, the present invention produces a purchase planning system and method that can be used to ensure optimal usage of the supply channels while complying with trading partner terms and conditions as well as enterprise business rules. Within the method of the present invention, the user models the supply channels, specifies the conditions for the optimization of the purchase schedule, optimizes the plan, analyzes the purchase schedules generated, exports the purchase schedules to external systems so as to dispatch purchase orders to suppliers and also has the ability to simulate virtual contractual situations to evaluate such situations.

The user can model a supply channel by providing various information elements about the supply channels. For example, the user may specify information on items to be purchased, the (requisitioning) sites where such demand originates, approved vendors who can supply these items, agreements with the vendors; agreement terms such as basic price, taxes, other costs, supply locations, and transportation modes. The user can further specify the payment terms, order parameters, lot sizes for ordering. In modeling basic prices, the user may model fixed unit based pricing, or volume based discounting, or price that is a function of time. Similar modeling constructs enable a user to model obligations, penalties and rebates that are either absolute, or based on a percentage, and that can also be a function of time.

After establishing the supply channels, the user defines the planning time periods, planning groups for items, and other planning configurations such as flags for allowing shortness, lot-size multiple constraint horizon, and earliest release date for the schedules. The user also provides any rules such as business splits to be maintained for the vendors in specified time periods.

The purchase plans are then generated by optimizing the given inputs. The system generates a mixed integer linear program formulation based on the objective function that minimizes the total cost of plan, and by generating constraints to model various terms and conditions that may have been modeled in the contractual agreements, or may be part of the corporate policies. The formulation is then solved using a solver and an optimal purchase schedule is generated.

The user can then analyze the impact of the generated purchase plan. Some examples of such analysis are: projected spend with various suppliers in various time periods; projected penalties for not meeting obligations if any; projected rebates that can be obtained; projected volume discounts that can be obtained; potential supply problems when capacity is constrained; and projected supplier splits that will be achieved if the proposed purchase plans were to be executed as such. If desired, the user can refine the plan by changing any of the input information and by generating purchasing plans again.

The user can then export the generated purchase schedules to an external system so as to dispatch purchase orders to suppliers. Examples of such systems are any transaction management systems that can manage purchase transactions, such systems are known as ERP (Enterprise Resource Planning) systems.

As the system allows the user to categorize the supply agreements by status and group, therefore the system also allows creation and inclusion of virtual supply agreements in above plans. These plans thus help in evaluating a contract that is still being considered but not finalized. This unique evaluation technique allows users to evaluate new or renewal contracts, not in isolation by themselves, but in context of all other agreements that the enterprise has in place. This evaluation technique provides a unique methodology for objectively evaluating each and every term and condition before such a contract is formally accepted.

BRIEF DESCRIPTION OF THE DRAWINGS

The following drawings have been provided as an aid to easily understanding the current invention. The text uses like reference numbers that represent corresponding parts throughout.

DETAILED DESCRIPTION

Field of the Invention

Figure 1:
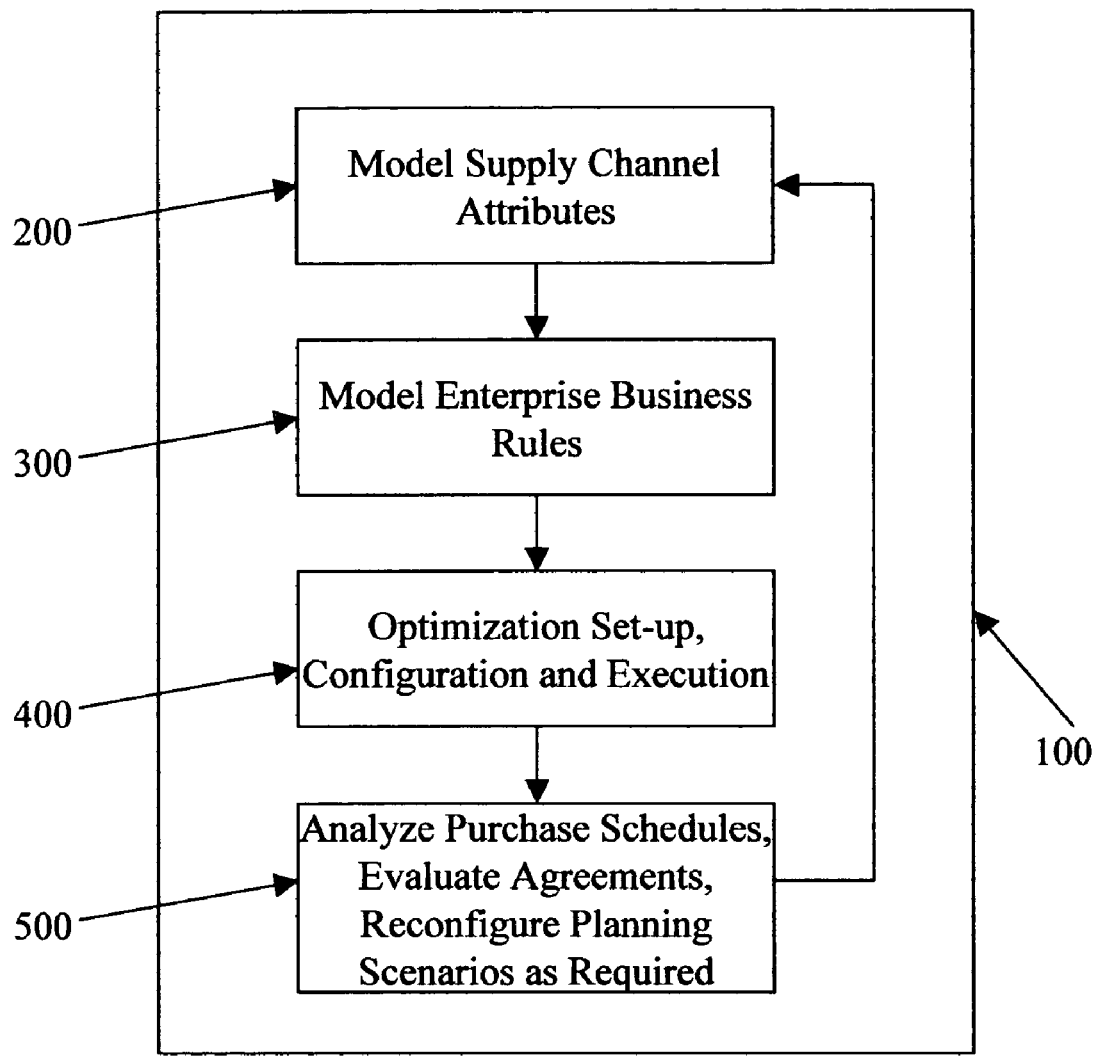
FIG. 1 shows the overall flowchart for purchase planning and optimization method.

The present invention relates to optimally planning the direct material purchases where such purchases are largely made through supply agreements; or terms and conditions that have been previously established with the vendors. It provides a channel management system for supplies and a method for determining an optimal, cost-minimizing set of purchase schedules based upon projected material requirements, and contractual constraints and enterprise business rules that must be met.

Description

Most of the enterprises have multiple supply channels for procuring their direct materials. A supply channel is a complete and independent channel that has the capability to define, create, and support a procurement transaction between a vendor and a buyer. As an example, if an item can be purchased from one vendor who can ship it from two warehouses, then this simple situation will have at least two supply channels, one from each vendor warehouse to the customer receiving location. It is important to understand that supply channels are not physical routes between two locations. These are abstract channels that can, each, independently be used for fulfilling the material requirements and have attributes different from any other channel for procuring the same material.

The purchase allocation decisions among various supply channels are typically done only once during the contract term and these are often made manually. As against this, most enterprises conduct master planning every week or more frequently. The changes in demand, resource and material conditions that make frequent master planning essential are equally critical in the purchase allocation process. However lack of suitable automation has kept the purchase allocation process out of sync with the dynamic master planning process. This leads to process inefficiencies and unnecessary procurement costs.

The present invention provides a solution by considering projected material demand, contractual obligations and other costs (examples of these costs being shipping, insurance, currency variations) to reduce the overall costs of direct material purchasing. It leverages optimization technologies and provides complete compliance to contractual terms and enterprise business rules. This leads to reduced inventory, compliance with trading partner terms and an optimized plan for minimizing the purchasing costs through the whole planning horizon.

The present invention provides a purchase planning and optimization method as well as a purchase planning and optimization system to help a user manage the supply channel network at strategic, tactical and operational levels.

The purchase planning and optimization system (1000) comprises of an input device (1010) for defining the supply channel network model, contractual terms and conditions model and the business rules model; a storage device (1030) for storing all of these models; an input device (1010) for setting up the conditions for optimization; an optimizer (1040) for determining an optimal purchase plan; an output device (1060) for analyzing the results; and a method to export the generated purchase schedules.

On a strategic level, the present invention can help the user project the status of current contracts, simulate scenarios for new contracts or evaluate the impact of business rules. On a tactical level, the present invention can help the user determine a best strategy for making purchase allocations among the available supply channels; and determine the best strategy for utilizing the negotiated supplier capacity. On an operational level, the present invention can help the user to determine purchase schedules for the near term.

The present invention assists the user in making critical decisions about the future by projecting long-term effects of changes in the supply channel network. For example, the user could simulate the effect of the new contract on the overall purchasing cost as well as the effect on the existing set of contracts before signing a contract. The long-term planning provides a projection of the status for all contracts. This could, for example, assist the user in identifying potential risk of penalties, and also the potential timing and amount of penalties.

The long-term effects of business rules and policies could also be evaluated. For example, if a supplier spend limit, either a maximum or a minimum, is imposed on a particular supplier then the user may want to analyze the impact of this business rule on other contracts and on overall purchasing cost.

The present invention also helps with medium-term tactical decisions and to provide forward visibility to suppliers about their allocations during the planning horizon. The optimal allocations can change frequently from one planning cycle to another, and could be influenced by factors such as obligations, penalties, price variations, volume/value discounts, expedite costs, shipping costs, taxes, tariffs, duties, supplier flex limits, allowed ship-to/ship-from combinations, supplier site capacities and many others.

The present invention also helps with near-term operational execution decisions such as purchase schedules to be released, expedite requests to be made and transport modes to be used.

Referring to FIG. 1, the user implements the purchase planning and optimization method (100) by performing the steps of setting up a supply channel network (200); setting up the partner contractual terms and conditions (200). Then the user proceeds through setting up the business rules (300); setting up the conditions for optimization and generating an optimal purchase plan to procure the required material (400); and analyzing the optimal purchase plan and fine-tuning the supply channel network (500).

Figure 2:
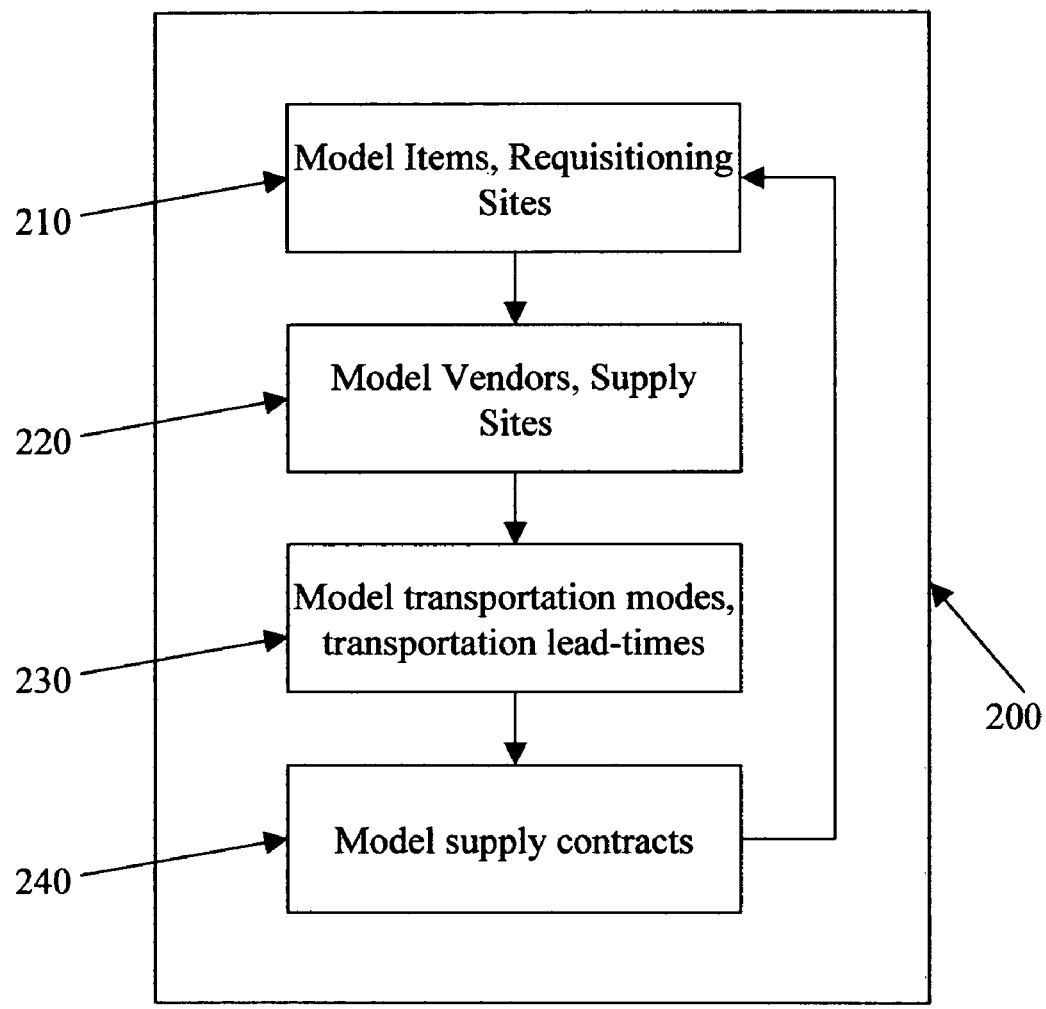
FIGS. 2 and 2A show the steps involved on modeling a supply channel for purchasing.

A supply channel network (200) is modeled by using numerous types of information provided by the user. This is depicted in FIG. 2. As an example, in one embodiment of the implementation, the user may specify items and requisitioning sites (210); vendors and locations of the supplier sites (220); transport modes available between the ship-from and ship-to locations and the associated transport lead times (230). Further the user may identify the contracts available to purchase the items (240), modeling these contracts through various attributes such as the contract start and end dates, the supplier sites that can supply the item to a particular customer site, and the transport modes that can be used to transport the item. The user may also specify holiday calendars for the supplier sites, ship-from and receiving locations for such contractual agreements.

The data to define and model the supply channels in (200) can be provided either through the input device (1010), or can be partially imported into the system's data model directly from other sources using the known ETL (extract, transform and load) processes. Some examples of the external systems from where such data may be partially pulled into the current system are known contract management systems, or known enterprise resource planning (ERP) systems.

Figure 2A:
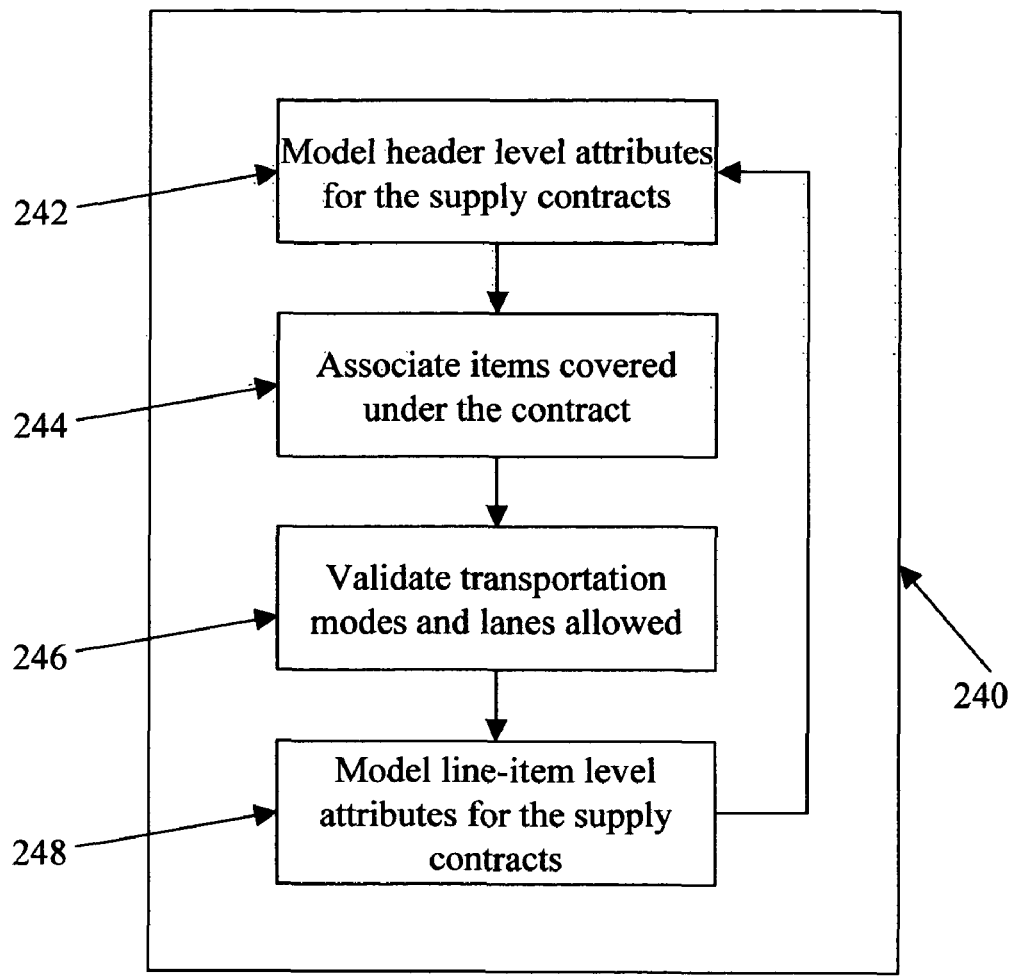
Figure 3:
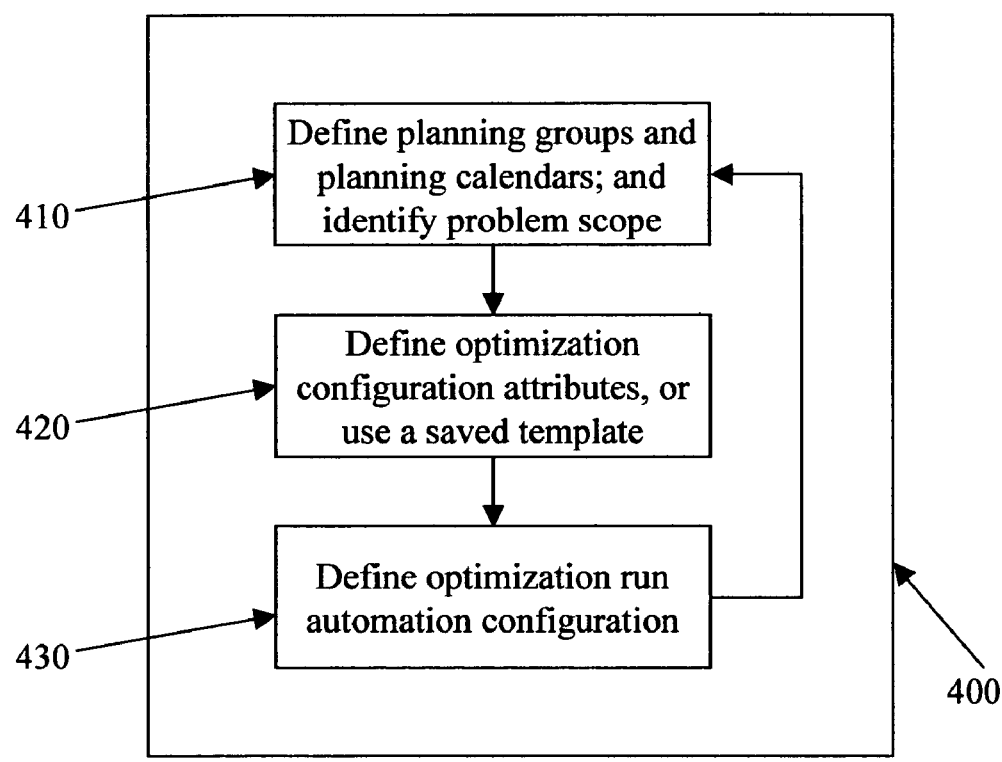
FIG. 3 shows the steps involved in defining the optimization configurations.

FIG. 2A further provides some of the details involved in modeling contractual data. This may involve providing the header level data (242) that would then be applied to all the line items covered in the contract. Examples of such data would be effective dates of the contract; payment terms; some of the taxes and costs; obligations and penalties; rebates; and other attributes like order acknowledgements, order processing lead times, order processing fees etc. All data that is modeled at the contract header level is considered whenever the optimizer evaluates a specific contract or an item involved in that specific contract. For example, if a contract specifies the value obligation at $200,000 worth of business within the contract term, then the system will include this fact during the problem formulation, and the corresponding penalty (if the obligation is not met) will be modeled as the cost function whenever any item from this contract is being planned for purchase. Similarly if a sales tax is applicable to all the items in the contract, it can be modeled only once at the header level and used for all the items by the system. The header level obligations, penalties and rebates are always value based. The user may further specify obligations and rebates to be imposed in specific time periods. The payment terms modeling for the supply contracts is provided through definition of system and user events. System events are pre-defined events of a purchase order transaction, where each event is distinctly identifiable by a change in the status of the order; and an associated transaction that is triggered by such a status change; the examples of such an event being "receipt of material" for an order, where this event may change the status from "ordered" to "received" and also triggers the generation of a material receipt note transaction. Such events through out the life cycle of the purchases have been pre-defined in the system. The users may further define custom events by selecting a pre-defined system event and providing a time direction and time duration from the selected event. For example, a user event can be defined based on the "receipt of material" event by specifying that the new custom event occurs "after" (being the time direction) "10 days" (being the time duration) from the selected system event. The user can uniquely name such custom events. Both, the system and the user defined custom events can be used to define payment terms. For example, extending the above example, the payment term may use the custom user defined event to signal that the full payment becomes due when the custom event occurs (which happens to be 10 days after material receipt which is distinctly identified through the corresponding material receipt transaction).

Step (244) in FIG. 2 prompts the user to define the items that a particular supply contract covers. Once these items are associated with the contract, and the status of the contract is made "active", then this contract will always be considered as one of the supply options by the system. The association of the items also enables the users to define item level attributes (248) to complete the modeling of the contract.

After defining the contract items in step (244), the user may further restrict the channels by validating the possible supply paths for each item in the contract by selecting the combinations of vendor ship locations, requisitioning locations and transport modes (246). The modeling of these channels provides the basis for the system to compute the total landed cost for each supply channel. For example, the transportation costs that are modeled in step (248) can be defined based on the combination of shipping location, receiving location and the transport mode. Other examples of costs that may vary with these factors and affect the total landed cost through a channel are taxes (example will be import duties that may vary by country of origin), handling, packaging and transit insurance costs.

Step (248) consists of defining all the other attributes of the contract that need to be modeled at the item level. Examples of such attributes are taxes, handling charges (these may be higher for some items like chemicals that require special handling), packaging, rebates that are that are specific to these items; and obligations and penalties that are specific to these items. At the item level the obligations and rebates can be specified either as quantities (of the items that must be purchased for a rebate to kick in, for example), or value. The user may further specify obligations and rebates to be imposed in specific time periods. Similarly, the user may specify other terms such as order handling lead-time, supply lead-time for an item at a supplier site, the supply capacity of a supplier site for an item and lot-sizing rules imposed by a supplier site for supplying an item.

The user may further specify contractual terms for unit prices and other costs in step (248). The unit price may be a simple price for a contract and an item, or may be based on purchase volume level, or may be time dependent. The suppliers may be able to offer better pricing at larger volumes because of the economies of scale, and volume discounts is also a way for the suppliers to encourage buyers to buy in larger volumes. The time dependent aspect of unit price may arise because of seasonal variations in price or because of dependence on a price index that change by time. Price equations can also be modeled using formulas that have parameters that may change with time. Various structures for modeling the basic price have been provided through various data constructs in the current invention with the intention of providing the ability to model the largest possible number of situations in which the prices can be negotiated in a contract.

The system further provides the capability of using these models to precisely construct the applicable prices in various planning buckets.

The system also provides a very flexible and extensive data model for the cost modeling in step (248). These are the costs that need to be defined in addition to the basic price. There could be numerous other costs associated with purchasing, such as shipping costs, taxes, tariffs, duties and insurance. Some of these costs may depend on the purchased quantity whereas other costs may depend upon the purchased value. As an example, shipping cost may depend upon quantity whereas sales tax may depend upon value. The user may define custom costs and also specify the nature of their dependence on purchase quantity and/or value. Furthermore, some costs such as transportation may additionally depend on the shipping route selected. The system provides data model and constructs to model all the above situations.

In some situations where an enterprise has active collaboration with the suppliers, it may be required that the projected supply requirements be shared with the vendors. Once these projected requirement numbers have been published to the specific vendors, there may be further restriction on how much these numbers can be revised during specific time buckets. Step (248) allows the users to cover such situations where short-term and medium-term purchase plans are shared with suppliers and there are flexible limits established which restrict the allowed percentage change in purchase quantities after these have been shared with the vendors. The very near term may be a frozen period with small/no changes allowed and in subsequent time periods up-flex and down-flex percentages may be specified. In such situations, the user may specify negotiated up-flex and down-flex percentages in frozen and collaboration time periods, as well as flexible quantity basis for periods for which forward visibility is provided. The system considers these as constraints so that these terms as part of the contractual agreements are not violated by the purchase schedules generated after optimization. The implementation of such constraints require computation of the flexible quantity basis for each period. Such calculations are automatically computed by the system. The flexible quantity basis for a period is the quantity communicated to a supplier for that period when the time period rolls-over either from a collaboration zone into the frozen zone or from the period beyond collaboration zone in to the collaboration zone. The up-flex and down-flex percentages are applied to the flexible quantity basis to establish the limits for allowed change in quantities. As an example consider that there is a two week window that is defined as the frozen horizon during which the quantities can be revised downwards with in 10%, and no upward revision is allowed. Further assume that during the current week, the projected shared material demand for week 3 is 500 units of widgets. Then next week (defined as current+1), when the week 3 rolls over as week 2 and comes within the two week frozen time period, then the demand can be revised within the limits of 450 and 500 units. Assume further that the projected demand shared with the vendor during this planning run is modified to 480 units, which is within the allowed range of 450 and 500 units. Then during the week after (current+2), the demand basis will still remain 500 and the changes will still be restricted within 450 and 500 units of widgets. The quantity of 500 units becomes the quantity basis for the frozen window.

The enterprise business rules are modeled based on inputs from the user in step (300). Some examples of such business rules are spend limits that the user may specify for each supplier. These spend limits (maximum and minimum) are to be applied across the purchases of all items from that supplier. The user may also specify strategic supplier allocation percentages for an item, which are to be imposed over the entire planning horizon and not necessarily in sub-periods within the horizon. The user may also specify that spend with a particular supplier is to be maximized or minimized without providing a hard number value as the target.

In step (400), the user specifies the set-up and configuration parameters for the optimization. Some examples of such attributes are following. User creates a planning calendar. Such planning calendar establishes the planning horizon by defining the start and end dates for the horizon, and the number and size of planning buckets. For Example a planning horizon may consist of one-year period divided into 4 weekly buckets, two monthly buckets and three quarterly buckets. These planning buckets are used by the system to compute things such as consolidated projected material requirements and weighted average prices in each one of the planning buckets throughout the planning horizon. The defined planning calendar can then be specified for an item or for a group of items. Each item, and/or item group must be associated with at least one planning calendar. The user may then select the scope of optimization problem (410). For example, a group of items can be selected for which the current run of the optimization should be executed. This group of items that is selected by the user for planning is referred to as the "planning group of items". The system then expands the scope of items to be included in the same optimization run so that any inter-dependencies among the items are modeled. This extended group of items created by the system from the user-defined "planning group of items" is referred to as the "optimization group of items". The system uses a complex logic for generating all items that affect each other during purchasing. For example, in one embodiment, if a widget A is supplied by one contract and is used for generating the automated optimization item group, then the system will go through the following series of steps to generate such a group: (a) system identifies all the contracts that this item can be sourced from, from this list the system short-lists those where header level obligations or rebates exist; (b) for all the contracts obtained in step (a), system generates a list of all the other items that are also supplied by the same contracts; (c) for all the items in the list, step (a) and (b) are repeated, (d) the sequence continues till the system reaches the end of such combinations. All these items are then grouped together as these affect each other either by way of common obligations or rebates through contract headers. Such a group is then logically specified for planning in the same run to produce optimal purchase schedules. The user may also specify other optimization configurations (420) such as planning buckets during which the planned schedules must be constrained on lot-sizes, earliest schedule release date and numerous other parameters that control the formulation and execution of the optimization problem. The system also provides the ability to configure the optimization runs to be executed automatically on a schedule, or manually. These can be set-up in step (430). These optimization configurations can also be saved in a template that can be used repeatedly.

Step (500) involves the analysis of the purchase schedules generated through optimization. While the individual purchase schedule transactions can themselves be analyzed, the system also provides pre-computed consolidated data. Examples of such analysis that is directly computed and provided to the user by the system are total basic price and other costs analysis by items, contracts, requisitioning sites; projected and historical values of business volumes and quantities that have been purchased by contract, by item, by requisitioning sites, etc. Such analysis quickly helps the user in identifying demand patterns, procurement trends and helps spot weaker contractual relationships. In another instance where virtual contracts have been modeled for the planning cycle, this analysis can quickly help in evaluating the virtual contract with respect to the existing purchase agreements and material needs. For example, the user may run multiple scenarios by changing certain terms on the virtual contract and may find that volume discounts can be negotiated with a new supplier based on the volume of projected business, and can further reduce overall cost. This information will then provide the user with an objective value to target during the price negotiations with this particular vendor.

It is to be noted that the above list of features used to exemplify the supply channel network, the partner contractual terms and conditions and business rules is non-exhaustive and is only meant as an illustrative sampling of possible data. Numerous other related facts and information may be included within the present invention.

The optimal purchase plan is generated by formulating a mathematical problem and by solving it using linear programming (LP) and/or mixed-integer linear programming techniques (MILP). The mathematical problem is representative of the supply channel network, contractual terms and conditions and business rules to the extent defined by the problem scope and problem configuration.

The need quantity and the need date are assumed to be known for the items to be purchased. The need dates may extend in to a long-term horizon that is as much as a year or more. In the preferred embodiment, it is also assumed that on-hand inventory; in-transit shipment quantities and open purchase order quantities are netted-out in determining the need quantities that are presented to the current system.

The need quantities are consolidated into planning time buckets that are defined by the user. In the preferred embodiment, the purchase quantity for a planning time bucket is ideally required to be no more or no less than need quantity in the time bucket, and also preferably not earlier or later than required. However, there could be circumstances where this is not possible. For example, the purchase quantity in a planning time bucket may have to be less than need quantity in the time bucket if there is a capacity shortage in the corresponding supply periods. Another example being flexible limits in the time bucket may not allow buying as much as need quantity. Similarly, the purchase quantity in a time bucket may have to more than need quantity. Flexible limits could once again be the reason for this or there could be lot-sizing rules that may require that purchase quantity should be a multiple of a certain quantity, whereas need quantity may not be a required multiple.

One embodiment of the formulation for need quantity is now described. Because of the nature of the planning strategy for need quantity as explained above, there could be infeasible situations if need quantity were to be modeled as a hard constraint. For this reason need quantities are modeled as soft constraints. A penalty is imposed on any short quantity. The penalty per unit short quantity of an item is set to be larger than the maximum per unit total cost across all the available supply channels for purchasing the item. The optimizer would find a solution such that the cost function, which includes the total cost for purchase quantity as well as penalty for short quantity, is minimized. Since per unit penalty is larger than the per unit actual purchase cost, the cost function would be minimized if short quantity were in fact zero, if that is a feasible solution. If any constraint, such as a capacity constraint, were to restrict the amount that can be purchased to be less than need quantity then the minimal cost solution in that situation would include penalty for short quantity. In particular it is to be noted that this scenario does not lead to an infeasible situation, which would be the case if need quantity were to be modeled as a hard constraint.

The constraint for need quantity for a particular item, site and planning time bucket, N, would be:

$q + d \geq N$, where q and d are the purchase quantity and penalty variables, respectively, for the same item, site and planning time bucket.

The purchase quantity variable for a particular item, site and planning time bucket is the sum of purchase schedule quantity variables of all the effective supply channels. Here a supply channel for an item, site and planning time bucket is defined to be a contract, supplier site, transport mode and choice of expedite options. Assuming that there are two supply channels for a particular item, site and time bucket and considering the embodiment where the purchase price is a simple unit price the objective function component relevant to q and d is:

$$F = s_1(c_1) + s_2(c_2) + d(c),$$

where $s_1$ and $s_2$ are the purchase schedule quantity variables associated with the two supply channels for item, site and time bucket; $c_1$ and $c_2$ are the unit prices associated with the two supply channels; and c is greater than maximum($c_1, c_2$). Note that, $$q = s_1 + s_2.$$

In another embodiment of planning strategy for need quantity, the user may want to buy quantity that is short, either earlier or later when possible. The user may also specify limits on how much earlier or later would be acceptable. In another embodiment of planning strategy for need quantity, the user may want to use any excess quantity in a time period as soon as possible in future time periods and also buy less by the same used amount, in those future time periods. All such embodiments of planning strategy for need quantity are formulated using methodology and penalty system similar to the one described for the preferred embodiment.

When unit price is time dependent then a weighted average unit price is used to compute the basic purchase cost in a planning time bucket. The weighted averaging is done based on the proportion of time that a certain price is specified in the planning time bucket.

When unit price is discounted based on volume steps, the basic purchase cost is modeled using integer variables in addition to linear variables. The optimal purchase quantity of an item, using a particular contract, by the end of the planning horizon may fall into any of the volume steps. A purchase quantity variable is introduced for each of these possibilities for the contract and item, say, $A_1$, $A_2$ and $A_3$, assuming there are three volume steps. Only one of these variables may be greater than zero, while the other two would have to be zero. By definition, the following constraints would hold for $A_1$, $A_2$ and $A_3$:

$A_1 \geq 0$,
$A_1 \leq j_1 (u_1)$,
$A_2 \geq j_2 (u_1)$,
$A_2 \leq j_2 (u_2)$,
$A_3 \geq j_3 (u_2)$, and
$A_3 \leq j_3 (u_3)$, where $u_1$, $u_2$ and $u_3$ are upper limits of the volume discount steps 1, 2 and 3, respectively; and $j_1$, $j_2$ and $j_3$ are binary variables that are further constrained as follows:

$$j_1 + j_2 + j_3 = 1.$$

One and only one of $j_1$, $j_2$ and $j_3$ would have to be 1, while the other two would have to be 0. If $j_1$ were to be 1 then note that the above constraints would force $A_2$ and $A_3$ to be zero. Similarly, if $j_2$ were to be 1 then $A_1$ and $A_3$ would be zero and if $j_3$ were to be 1 then $A_1$ and $A_2$ would be zero. Thus, the purchase quantity for the item and contract would be the sum of $A_1$, $A_2$ and $A_3$. This purchase quantity is also equal to the sum of quantity purchased to-date, Z, and the sum of purchase schedule quantities across all supply channels for the item and contract with delivery periods through the planning horizon, which may be expressed as follows:

$$Z + \Sigma.s = A_1 + A_2 + A_3.$$

The objective function component corresponding to basic purchase cost of .Sigma.s is as follows, assuming Z falls into the first volume step:

$$F = [A_3 - j_3(u_2)](c_3) + j_3 [(u_2 - u_1)(c_2) + (u_1 - Z)(c_1)] + [A_2 - j_2(u_1)](c_2) + j_2(u_1 - Z)(c_1) + [A_1 - j_1(Z)](c_1),$$

where $c_1$, $c_2$ and $c_3$ are the unit prices in the volume steps 1, 2 and 3, respectively. If Z were to fall into volume step 2, then the objective function component corresponding to basic purchase cost of .Sigma.s would be as follows:

$$F = [A_3 - j_3(u_2)](c_3) + j_3(u_2 - Z)(c_2) + [A_2 - j_2(Z)](c_2).$$

The approach to model basic purchase cost when there are any numbers of volume discount steps and quantity purchased to-date falling into any of the volume discount step is similar to the one described above.

The supply capacity, which is negotiated in a contract, for an item at a supplier site is modeled as a hard constraint. The purchase order schedules that are to be supplied from a supplier site to any of the customer sites consume the capacity at the supplier site. Thus, the total purchase quantity across all schedules in a given supply period for a contract, item and supplier site is required to be less than or equal to the supply capacity in the supply period for the contract, item and supplier site.

The supply period start date and end date for a purchase schedule are determined by subtracting the total lead-time of the corresponding supply channel from the start date and end date of the delivery time bucket, respectively. The purchase schedules for an item, delivered for a certain planning time bucket, using a certain contract and from a certain supplier site may not all have the same supply period. This is because the total lead-time may not be the same for all the supply channels that correspond to the above-mentioned purchase schedules. In order to impose the capacity constraints, in one embodiment, the purchase schedules are split into multiple variables each of single day duration. The capacity constraint for any particular day is then imposed on the sum of all the split schedule quantity variables that consume capacity from that day.

For example, consider a scenario with two requisitioning sites each with a supply channel to a particular supplier site, for an item using a certain contract. The lead-time from the supplier site to requisition site1 is 5 days and to requisition site2 is 4 days. Consider a planning time bucket that is 2 days long, say, covering day 8 and day 9. So, the corresponding supply period is also 2 days long. But, the supply period corresponding to supply channel1 (from supplier site to requisition site 1) is offset by 5 days lead-time from the planning time bucket, whereas the supply period corresponding to supply channel 2 (from supplier site to requisition site2) is offset by 4 days. Thus, the supply channel1 consumes capacity of the supplier site on day 3 and day 4, and the supply channel2 consumes capacity of the supplier site on day 4 and day 5. In this scenario, there would be three capacity constraints:

$s_{11}$ ltoreq C (constraint for day 3), $s_{12} + s_{21}$ ltoreq C (constraint for day 4), and $s_{22}$ ltoreq C (constraint for day 5), where, $s_{11}$ is the schedule quantity split for day 3 for supply channel 1, $s_{12}$ is the schedule quantity split for day 4 for supply channel1, $s_{21}$ is the schedule quantity split for day 4 for supply channel2, $s_{22}$ is the schedule quantity split for day 5 for supply channel2, and C is the maximum supply capacity per day available at the supplier site for the considered item.

In some other embodiments capacity constraints are imposed with fewer purchase schedule splits, to reduce the number of variables to be solved.

The obligations at contract header and contract item levels, which may further be specified for several periods of time and which may be either quantity based or value based, with penalties that are computed as a percentage of short quantity or short value are modeled using the same approach as that outlined for need quantity modeling using soft constraints. In this case the penalty is not used to model a soft constraint, but is in fact a real penalty. For example, in one embodiment, where the user specifies value obligation, V, for a contract and item; and associated penalty as percentage of the short value, p; and unit price as a simple price, c; the formulation is as follows:

The sum of value purchased to-date, value of the purchase schedules across all the supply channels for contract and item, and penalty is constrained to be greater than or equal to V:

$$Y + (c).\Sigma.s + S \text{ gtoreq } V,$$

where Y is value purchased to-date and S is the short value. The objective function component corresponding to the penalty is, $$F = S(p/100).$$

When the penalty is specified as a fixed value, W, as opposed to being a percentage of the short value, additional constraints are introduced as follows:

S gtoreq j, and

S ltoreqj (V), where j is a binary variable. The objective function component corresponding to the fixed value penalty is, $$F = j(W).$$

The penalty may be specified as the sum of a fixed value and a percentage of the short value, in which case the objective function component corresponding to the penalty is, $$F = S(p/100) + j(W).$$

When the unit price is not a simple price, but say, is based on volume discount steps, then quantity obligations and associated penalties are modeled using a technique similar to the one presented earlier for modeling basic purchase cost in the presence of volume discount steps.

As opposed to obligations, there may be rebates that are available as a percentage of quantity or value exceeding a rebate point quantity or value and/or a fixed rebate for exceeding the rebate point quantity or value. These rebates may be available at contract header and at contract item levels, and may further be specified for several periods of time. One embodiment of the formulation for rebates is explained below.

In the situation where the user specifies a rebate point value, R, for a contract and item; and associated rebate as a percentage of the exceeding value, r, as well as a fixed rebate, G, and unit price as a simple price, c; the formulation is as follows:

The optimal purchase value of an item, using a particular contract, by the end of the planning horizon may fall below the rebate point value R or may be above the same. Purchase value variables are introduced for each of these two possibilities for the contract and item, say, X.sub.a, and X.sub.b. Only one of these two variables may be greater than zero, while the other would have to be zero. By definition, the following constraints would hold for X.sub.a, and X.sub.b:

X.sub.a gtoreq 0,
X.sub.a ltoreq j.sub.a (R),
X.sub.b gtoreq j.sub.b (R), and
X.sub.b ltoreq j.sub.b (M),
where M is a very large number; and j.sub.a, j.sub.b are binary variables that are further constrained as follows:

$$j.sub.a + j.sub.b = 1.$$

One and only one of j.sub.a and j.sub.b would have to be 1, while the other would have to be 0. If j.sub.a were to be 1 then note that the above constraints would force X.sub.b to be zero. Similarly, if j.sub.b were to be 1 then X.sub.a would be zero. Thus, the purchase quantity value for the item and contract would be the sum of X.sub.a and X.sub.b. This purchase quantity value is also equal to the sum of value purchased to-date, Y, and the sum of purchase schedule quantity value across all supply channels for the item and contract with delivery periods through the planning horizon, which may be expressed as follows:

$$Y + (c).Sigma.s = X.sub.a + X.sub.b.$$

The objective function component corresponding to rebates is, $$F = -[X.sub.b - (R)j.sub.b](r/100) - j.sub.b(G).$$

As opposed to unit price that is specified for a unit quantity of an item the user may specify costs with a quantity basis greater than 1. For example, shipping cost, t, may be specified for a quantity basis, b. In this case the shipping cost for a purchase schedule quantity that is less than b would still be t. Such costs are formulated as explained below.

The following constraints are enforced for a purchase schedule quantity with such quantity-based costs:

s−(b) i ltoreq 0, and
s−(b) i gtoreq (1−b),
where i is an integer variable. The objective function component corresponding to the quantity-based cost is then, $$F = i(t).$$

In another embodiment, a model with costs that have a quantity basis greater than 1 is solved in two iterations. In the first iteration, the quantity basis is in fact considered to be 1 for all the costs, the costs are proportionately converted to unit costs, and a solution is obtained for the model. In the second iteration, the constraints and objective function component mentioned above for quantity-based costs are modeled. In addition, the integer variable, i, is more tightly bounded. The following example illustrates the method. Let the schedule quantity solved in first iteration for a supply channel, say, channel1 be 58. Consider the quantity basis for a certain cost associated with channel1 to be 10. Consider the quantity basis for all the other costs associated with channel1 and the quantity basis for all the costs associated with other supply channels to be 1. In this case, the optimal schedule quantity for channel1 in the second iteration would be in the range of 50 to 60, both values included. Thus, the integer variable, i, in the second iteration can be tightly bounded to a range of 5 to 6, both included.

Another kind of costs that may be associated with a schedule is costs that do not depend on the quantity of the schedule, but on an attribute of a schedule such as a fact that it is expedited. Such costs are formulated as explained below.

For the situation where a purchase schedule is expedited with an expedite cost, e, the following constraints are enforced on the expedited purchase schedule quantity variable:

s gtoreq j, and
s ltoreq j (C),
where j is a binary variable and C is the capacity of the supply period associated with the purchase schedule. The objective function component corresponding to the expedite cost is then, $$F = j(e).$$

In certain situations the user may specify lot-sizing rules to be followed for purchase schedule quantities. The lot-sizing rules may be in the form of a minimum, a maximum and/or a multiple of a certain specified quantity. In one embodiment of lot sizing where the lot-size-multiple, L, is less than the min-lot-size, m; and max-lot-size, M, is greater than the capacity of the purchase schedule supply period, C; the formulation is as explained below.

The following constraints are enforced on the purchase schedule quantity variable:

s=i(L),
i gtoreq j (m/L), and
i ltoreq j (C/L),
where i is an integer variable and j is a binary variable. Similar formulations are used for other embodiments of lot sizing rules.

In some embodiments, it may be possible to restrict a schedule quantity variable to only a few of the lot-sized quantities, to find an optimal solution. Consider a scenario where there are two supply channels, channel1 and channel2, to fulfill a need quantity of 250 in a certain planning time period. Consider the channel1 schedule quantity, s.sub.1, to be constrained to lot-size parameters of: L=25, m=100, and M=500. And let the channel2 schedule quantity, s.sub.2, to be not constrained by lot-sizing parameters. If the lot-sizing constraints were not there for s.sub.1, let the optimal solution be: s.sub.1=168, and s.sub.2=82. Let us call this is as first iteration solution. The lot-sizing constraints are enforced in the second iteration model. In the second iteration, it is sufficient to consider the values of 150 and 175 for s.sub.1, to find an optimal solution. In this case, the lot-size constraints can be reformulated as follows:

s.sub.1=150j.sub.1+175j.sub.2,
s.sub.2 ltoreq 100,
s.sub.2 gtoreq 75, and
j.sub.1+j.sub.2=1,
where j.sub.1, and j.sub.2 are binary variables. It is much more efficient to solve the reformulated model.

The user may also specify business rules such as supplier spend maximum and minimum spend limits or constraints such as supplier flexible limits. The user may specify that such rules be formulated either as hard constraints or as soft constraints. When the rules are modeled as hard constraints a feasible solution may not be possible. When a rule is specified as a soft constraint the user would also specify an associated penalty. In this case, in the optimal solution the rule may or may not be enforced depending on the amount of penalty and the relative value of the penalty compared to other penalties.

An optimal purchase plan is generated, after the formulation is completed, by solving the LP or the MILP problem using known mathematical techniques and heuristics.

Once the solution has been obtained, the analysis step allows the user to analyze the results. Such analysis involves but is not limited to creation and review of reports based on the purchase plans output from the system, consolidation of data and presentation in pivot tables and/or multi-dimensional formats, aggregation along natural dimensions in the data, some examples of such aggregation being item groups, vendor groups.

Figure 4:
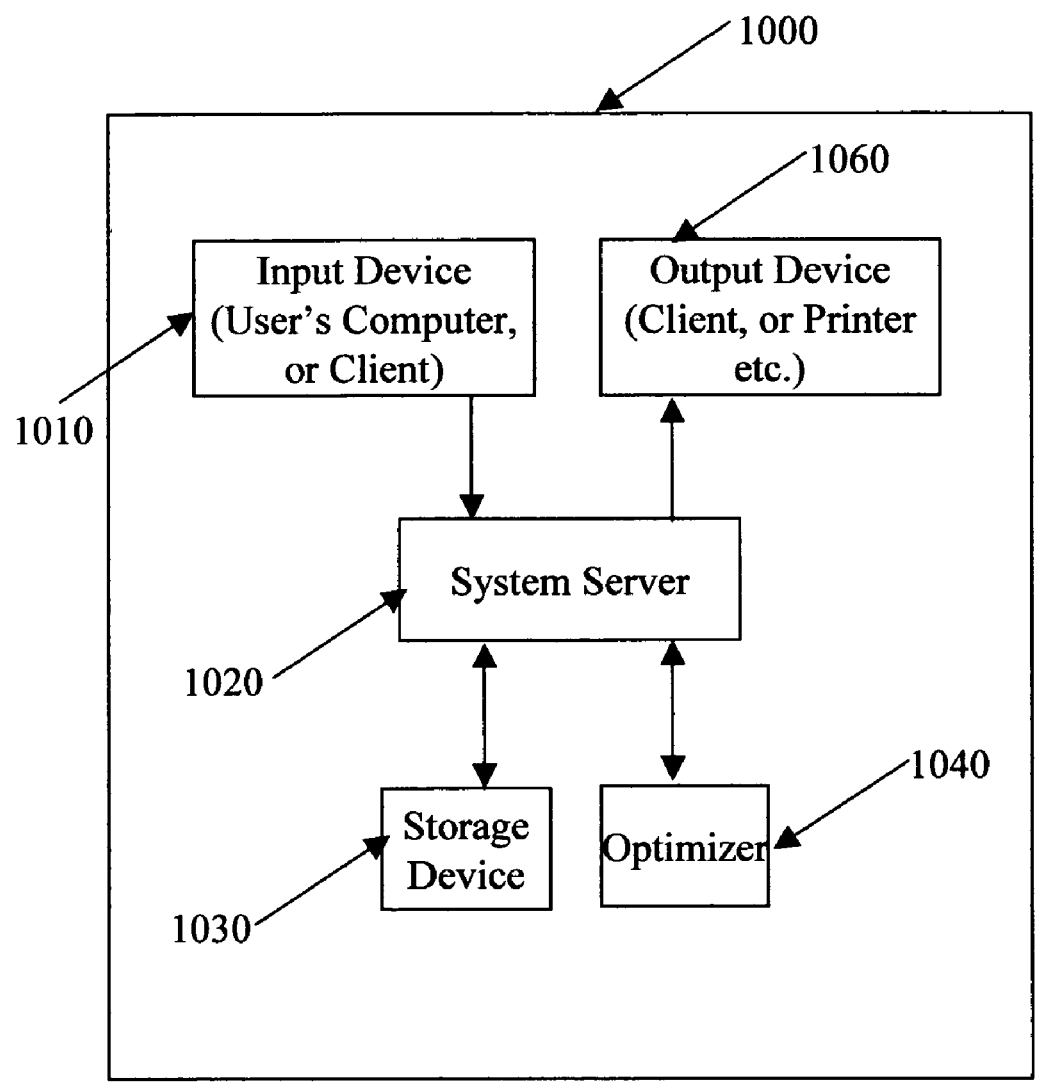
FIG. 4 shows the overall system for purchase planning and optimization.

FIG. 4 shows the major components of the purchase planning and optimization system (1000) that may be used to implement the purchase planning and optimization method (100). The system (1000) includes an input device (1010). Examples of typical input devices will include keyboards and pointing devices, such as a mouse. The system (1000) in FIG. 4 also includes a storage device (1030). This device receives and stores the user's input from the input device (1010). It may also accept and store modeling information from an outside source. The data model underlying the present invention allows the user to model the supply channels with objects and processes and maintains the relationships among these objects or processes in a way that ensures referential integrity. To achieve this functionality, the storage device (1030) uses known relational database models. This storage device (1030) also stores other system data such as optimization configurations, contractual models, output plans. The system allows the users to simultaneously create and persist multiple planning outputs under different unique names and compare them with one another as in step (500).

As FIG. 4 shows, the system (1000) also includes an optimizer (1040). The optimizer electronically connects to the server computer (1020), and can exchange information with other components through the server. Using this information, the optimizer (1030) conducts the optimization as in step (400). The optimizer (1030) may include a linear programmer or a similar data analysis tool that are readily available. An alternative configuration of the system (1000) may work as an automated batch process and may not require separate input device as shown. In such cases the input will be electronically provided to the server that stores it in the storage device, and also uses it for formulation of the optimization problem.

The output device (1060) is a device where the results of the optimization are shown to the user. This will typically be a video display or a printer. This device helps the user conduct the analysis step of (500).

The above description of the embodiments of the invention has been presented for the purposes of illustration. It is not intended to be exhaustive or to limit the invention to the precise form disclosed and many modifications and variations are possible. Since many embodiments of the invention can be made without departing from the spirit and scope of the invention it is intended that the scope of the invention be not limited by this detailed description, but rather by the claims appended hereto.

The invention claimed is:

1. A method for producing optimal purchase schedules for an enterprise, using an electronic computing device, the method comprising the steps of:

causing the electronic computing device to create a plurality of supply channel models, said models defining attributes of a plurality of supply channels, wherein the attributes include supply channel master data of items, requisitioning sites, vendors, vendor sites, transport modes, supply agreement parameters, and corporate business rules;

creating a scope for planning, wherein creating the scope for planning includes defining the optimization configurations by specifying the following parameters of an optimizer: the number of time buckets through which material can be ordered in advance, the point in the planning horizon through which lot-sizing rules must be applied, the point in the planning horizon through which minimum order lot-size rules must be applied, a flag for allowing shortness either by lot size multiple or minimum lot size, and a flag for ignoring prices and costs, wherein creating the scope for planning further includes:

solving linear programming models to determine how an order quantity of a desired item is to be split between multiple suppliers, wherein the solving comprises:

determining a first optimal solution by solving a first iteration that ignores lot sizing restrictions, determining a second optimal solution by solving a second iteration that considers the two closest values to the first optimal solution that are multiples of a desired lot size;

analyzing output purchase schedules, wherein the output purchase schedules consist of real and virtual planning scenarios, through analysis of purchase costs, basic prices, contractual obligations, rebates and penalties, fulfillment, and compliance with contractual terms;

analyzing enterprise compliance, wherein analyzing enterprise compliance comprises analyzing compliance with purchase quantities and flex limits, payment terms, lead time provided for order processing, supply and transportation costs and taxes, and basic prices, before the output purchase schedules are finalized as orders and sent to a vendor; and generating, by the electronic computing device, an optimal purchase plan for obtaining quantities of an item from multiple potential vendors based on the supply channel models, a solution to the second linear programming iteration, the analyzed output purchase schedules, and the analyzed enterprise compliance.

2. The method of claim 1 wherein analyzing enterprise compliance further comprises computing a compliance scores for output purchase schedule compliance against agreement parameters of basic prices, other costs in the agreement, transportation routes, lot-size multiples, order lot size, payment and credit terms, lead time for order processing and order acknowledgements, order fulfillment on time and quantity ordered, lead time for supply, lead time for transportation, expedite lead time requests, and expedite process fees when due.

3. The method of claim 1 further comprising: evaluating virtual planning scenarios in which virtual agreements have been modeled to find the effects of such virtual agreements on existing supply situations, projected purchase costs, and agreement terms.

* * * * *